United States Patent
Blair et al.

(10) Patent No.: US 7,809,241 B2
(45) Date of Patent: Oct. 5, 2010

(54) AUDIO FREQUENCY SCALING DURING VIDEO TRICK MODES UTILIZING DIGITAL SIGNAL PROCESSING

(75) Inventors: Ronald Lynn Blair, Carmel, IN (US); Mark Alan Schultz, Carmel, IN (US); Robert Warren Schmidt, Carmel, IN (US)

(73) Assignee: Thomson Licensing, Boulougne-Billancourt (FR)

( * ) Notice: Subject to any disclaimer, the term of this patent is extended or adjusted under 35 U.S.C. 154(b) by 3008 days.

(21) Appl. No.: 10/086,649

(22) Filed: Mar. 1, 2002

(65) Prior Publication Data

US 2003/0165084 A1    Sep. 4, 2003

(51) Int. Cl.
*H04N 5/91* (2006.01)
(52) U.S. Cl. .......................................... 386/75; 386/68
(58) Field of Classification Search ..................... None
See application file for complete search history.

(56) References Cited

U.S. PATENT DOCUMENTS

| | | | |
|---|---|---|---|
| 5,893,062 | A | 4/1999 | Bhadkamkar et al. |
| 6,154,603 | A | 11/2000 | Willis et al. |
| 6,360,198 | B1 | 3/2002 | Imai et al. |
| 6,484,137 | B1 | 11/2002 | Taniguchi et al. |
| 6,658,197 | B1 * | 12/2003 | Shimura ....................... 386/68 |
| 6,925,340 | B1 * | 8/2005 | Suito et al. ..................... 700/94 |

FOREIGN PATENT DOCUMENTS

| | | |
|---|---|---|
| JP | 6-139289 | 5/1994 |
| JP | 8-287612 | 11/1996 |
| JP | 11-86448 | 3/1999 |
| JP | 11-194796 | 7/1999 |
| JP | 11-213557 | 8/1999 |
| JP | 2000-339857 | 12/2000 |

* cited by examiner

*Primary Examiner*—Thai Tran
*Assistant Examiner*—Heather R Jones
(74) *Attorney, Agent, or Firm*—Robert D. Shedd; Robert B. Levy; Jorge Tony Villabon

(57) ABSTRACT

The invention concerns a method and apparatus for audio track playback during fast forward playback video trick modes. A storage medium reader is provided for reading digital data from a storage medium such as a DVD. The digital data represents a video presentation and a corresponding audio programming. A decoder decodes from a portion of the digital data comprising the audio programming a plurality of digital audio samples corresponding to a selected portion of the video presentation. Subsequently, a digital signal processor can convert the audio samples to their corresponding frequency domain equivalents and scale the frequency and amplitude of a playback audio frequency associated with the audio samples in accordance with trick mode video playback.

24 Claims, 3 Drawing Sheets

AUDIO FREQUENCY SCALING DURING VIDEO TRICK MODES UTILIZING DIGITAL SIGNAL PROCESSING

BACKGROUND OF THE INVENTION

1. Technical Field

The invention concerns improved trick mode playback, and more particularly to improvements in the trick mode playback of audio soundtrack associated with a video segment played back at a faster or slower than normal speed.

2. Description of the Related Art

DVD trick modes can include speedup or slowdown of normal playback to either search for a specific location on the disc or to look at picture details that would be missed at normal play speed. By convention, normal playback speed can be denoted as 1x. Both audio and video trick modes are possible and both can be found on commercially available DVD players. However, conventional methods for playback of audio at fast or slow speed have proved to be problematic. The advancement of digital signal processors and especially audio digital signal processors that are used in currently available products have created the possibility for more sophisticated real-time processing for improved audio trick modes.

One problem with the use of video trick modes concerns the treatment of audio content corresponding to a playback video segment. For example, when a user speeds up or slows down a displayed video segment, the corresponding audio segment that is played back can be distorted. Typically, audio samples in the audio segment can be shifted to higher frequencies during a fast trick mode, and to lower frequencies during a slow trick mode. The fast trick modes that increase the playback speed by a factor of between about 1.5 to 3 times as compared to normal playback will tend to cause human speech to sound higher in pitch. This higher pitched audio playback, the chipmunk effect, can be annoying and in many instances may be unintelligible to a listener. Conversely, slow frequency trick modes can produce a low frequency wobble that may be understandable but not aurally pleasing.

In order to obtain the most useful audio playback during video trick modes as described herein, it is also necessary to consider the nature of the particular trick mode. For example, while it may be possible to utilize various techniques to provide intelligible audio for 1.5x or 2x trick modes, such techniques may provide unsatisfactory results when the trick mode involves playback at 5x or 10x. At such high playback speeds, any attempt to play back audio programming in synchronism with the video content may result in unintelligible speech due to the very rapid rate at which words would need to be presented.

To avoid hearing various types of audio artifacts that can result during DVD trick modes, conventional DVD players will often mute the audio during video trick modes. However, this is not an entirely satisfactory solution as the audio may be of interest in such modes. Accordingly, it would be advantageous if a DVD player could playback audio in a manner that overcomes the limitations of the prior art and achieves a desirable and aurally pleasant playback of audio program content during video trick mode operation.

SUMMARY OF THE INVENTION

The invention concerns a method and apparatus for improved playback of audio programming during video trick modes. The trick mode can provide a playback speed that is faster or slower than normal 1x play speed. The coded digital data can comprise video programming with corresponding audio content. A decoder can be configured to decode from a portion of the digital data comprising the audio content, a plurality of digital audio samples corresponding to a selected portion of the video presentation. Subsequently, a digital signal processor (DSP) can translate the audio samples from time domain to frequency domain and scale a playback audio frequency associated with the audio samples to compensate for the changed audio pitch resulting from the trick mode playback speed.

According to one aspect of the invention, for fast trick modes, the decoder can drop selected ones of the audio samples at a rate approximately corresponding to a selected trick mode video playback speed of the video presentation. A digital-to-analog (D/A) converter can subsequently generate an audio playback signal corresponding only to a remaining set of the audio samples. The audio samples can be dropped at an average rate of approximately (n−1) of every n samples, where n is equal to the selected trick mode playback speed relative to a normal playback speed. In order to compensate for the dropped audio samples, the DSP can transform the audio samples, which are in the time domain, to their frequency domain equivalent and preferably frequency scale the playback audio pitch by a factor of approximately 1/n. Additionally, the amplitude of the audio samples can be scaled by a factor of approximately 1/n. Subsequent to amplitude and frequency scaling the frequency domain audio samples, the DSP can transform the scaled frequency domain audio samples into to their corresponding time domain equivalent for playback.

According to an alternative aspect, for slow speed trick modes, the decoder can repeat selected ones of the audio samples at a rate that is inversely proportional to a selected trick mode video playback speed of said video presentation. This can produce a trick mode set of audio samples. The trick mode audio samples can subsequently be provided to the digital to analog converter to generate an audio playback signal corresponding to the trick mode set of audio samples. The audio samples can be repeated 1/n times, where n is equal to the selected trick mode playback speed relative to a normal playback speed. In order to compensate for the additional audio samples, the DSP can transform the audio samples from time domain to frequency domain and frequency scale the playback audio frequency by a multiplying factor of approximately 1/n. The amplitude of the frequency domain audio samples can also be scaled by a factor of approximately n. The DSP can subsequently transform the frequency and amplitude scaled frequency domain audio samples into their time domain equivalents for playback.

DETAILED DESCRIPTION

The present invention can provide substantially normal audio playback during video trick modes in any type of digital video recorded on any suitable digital data storage medium.

For convenience, the invention shall be described in the context of a DVD medium utilizing conventional MPEG-1 or MPEG-2 format. However, those skilled in the art will appreciate that the invention is not limited in this regard. The digital data storage medium can include any media that is capable of storing substantial amounts of digital data for retrieval and playback at a subsequent time. As used herein, a storage medium can include, but is not limited to, optical, magnetic and electronic means for storing data. Exemplary digital storage media can include an optical digital versatile disk (DVD), magneto-optical disk, a magnetic hard disk, a video CD or regular CD, or solid-state memory such as dynamic random access memory (DRAM) or synchronous DRAM (SDRAM).

Figure 1:
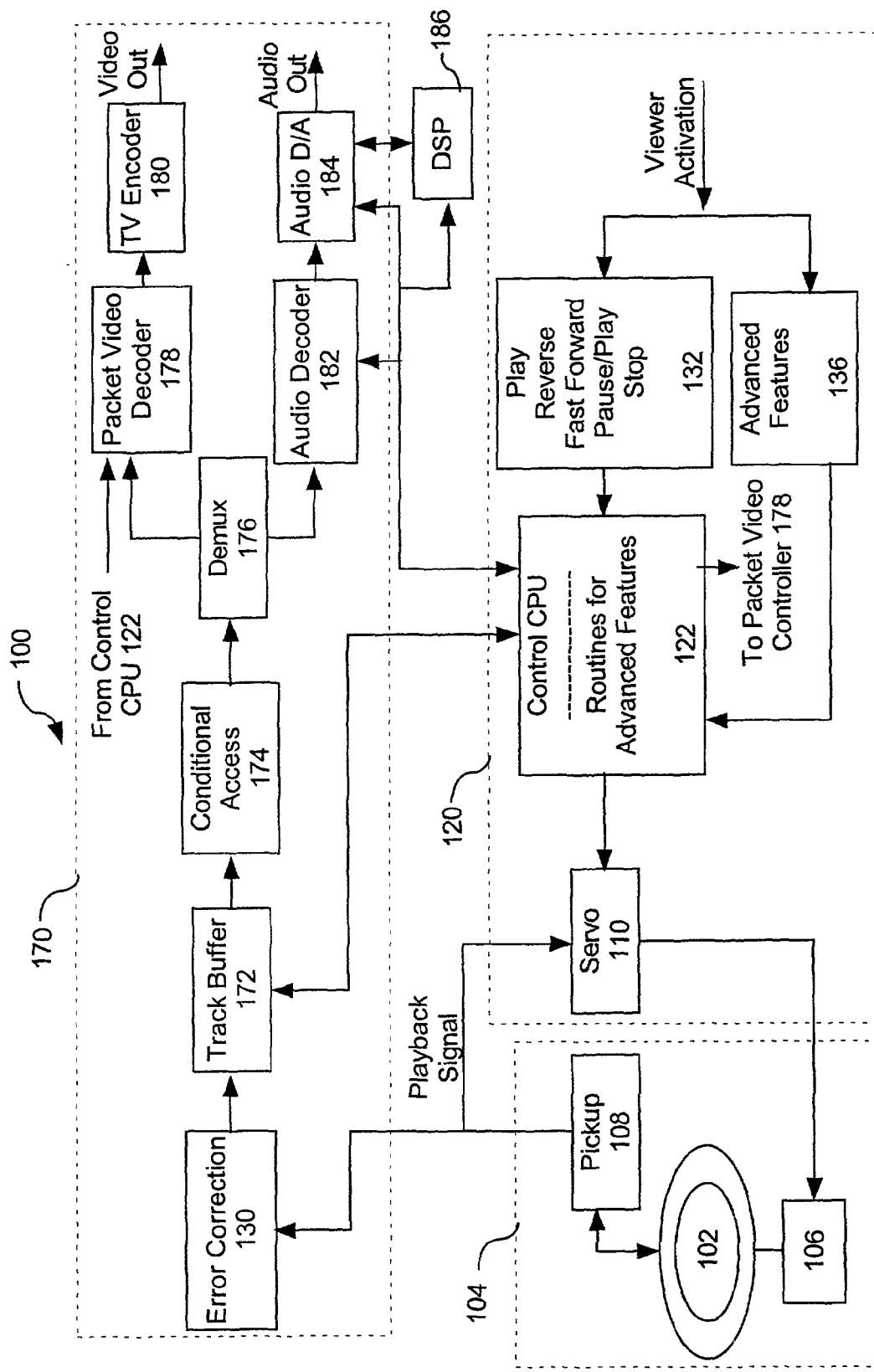
FIG. 1 is a block diagram of a DVD device that can be provided with one or more advanced operating features in accordance with the inventive arrangements.

A storage medium reader is provided for reading coded digital data from a digital data storage medium. FIG. 1 is a block diagram of an exemplary DVD video player in which the present invention may be implemented. The device 100 can have the capability to read stored data from a digital storage medium. Referring to FIG. 1, the storage medium can be a re-writable disk, DVD 102. Device 100 can include a mechanical assembly 104, a control section 120, and an audio/video (A/V) output processing section 170. The allocation of most of the blocks to different sections is self-evident, whereas the allocation of some of the blocks is made for purposes of convenience and is not critical to understanding the operation of the device 100. Importantly, it should be recognized that if the digital data storage medium were a solid-state device, the mechanical assembly 104 would not be necessary to practice the invention. In this case, the coded digital data stored in the digital storage medium can be directly accessed by control CPU 122 and buffered in track buffer 172.

Notwithstanding, the mechanical assembly 104 can include a motor 106 for spinning disk 102 and a pickup assembly 108 adapted to be moved over the spinning DVD 102. A laser mounted on the pickup assembly 108 can illuminate data already stored onto the track for playing back video and/or audio program data. For purposes of understanding the invention, it is irrelevant whether the disc is recordable. The laser mounted on the pickup assembly 108 and the motor 106 can be controlled by a servo 110. The servo 110 can also be configured to receive an input playback signal representing data read from spiral tracks on the DVD 102. The playback signal can also serve as an input to an error correction circuit 130, which can be considered part of the control section 120 or part of the A/V output processing section 170.

The control section 120 can include a control central processing unit (CPU) 122. The servo 110 can also be considered part of the control section 120. Suitable software or firmware can be provided in a memory for the conventional operations performed by control CPU 122. In addition, program routines for the advanced features as described herein can be provided for controlling CPU 122. The program routines can include application code and/or firmware code.

A control buffer 132 for viewer activatable functions can be configured to indicate those functions presently available, namely play, reverse, fast forward, slow play, pause/play and stop. The pause function is analogous to a pause operation typically found on most videocassette recorders (VCRs). The pause function can have the capability to manual interrupt the playback of a prerecorded presentation in order to halt or eliminate undesired segments such as commercials, from a playback. Advanced features buffer 136 can be provided for implementing other advanced playback functions, including control of trick modes as described herein. Playback trick modes can include forward and reverse playback at speeds other than standard 1× playback speed.

The output processing section 170 can include an error correction block 130 and a track buffer or output buffer 172, in which data read from the disc can be buffered and assembled into packets for further processing. The packets can be processed by conditional access circuit 174 that controls propagation of the packets through demultiplexer 176 and into respective paths for video and audio processing. The video can be decoded by decoder 178, for example from MPEG-1 or MPEG-2 formats, and encoded to form a conventional television signal format such as ATSC, NTSC, SECAM or PAL. The audio can be decoded by decoder 182, for example from MPEG-1 or MPEG-2 formats, and converted to analog form by audio digital-to-analog (D/A) converter 184. The audio D/A 184 can process digital audio received from the audio decoder 182 and produce an analog output signal.

The player 100 can preferably include a digital signal processor (DSP) 186, which can be controlled by the control CPU 122. Digital signal processor 186 can perform audio frequency scaling during video trick modes. Digital signal processor 186 can receive from audio decoder 184, digital audio samples corresponding to a selected video presentation being played. In standard, non-trick modes, DSP 186 can remain inactive and the audio D/A 184 can process digital audio received from the audio decoder 182. However, when a trick mode playback has been selected, the audio D/A 184 can be configured to receive specially processed digital audio from the DSP 186.

Digital signal processor 186 can be any commercially available processor that is designed to perform conventional audio processing functions, provided however that the DSP 186 can be configured to perform frequency and amplitude scaling. To facilitate scaling of the frequency and amplitude of an input audio signal, the DSP can convert the input audio signal that is in the time domain to a frequency domain audio signal. The frequency domain audio signal can be scaled and subsequently transformed back to a time domain audio signal. Digital signal processors commonly make use of various audio processing algorithms and techniques for accomplishing frequency and amplitude scaling. Notwithstanding, the invention is not limited in this regard.

Digital signal processor 186 can be a customized processor that can be used for frequency scaling. A field programmable gate array (FPGA) can be customized to include all the audio processing circuitry that is necessary for receiving a time domain audio signal, converting the received signal to a frequency domain signal, scaling the converted signal and converting the scaled signal to a scaled time-domain audio signal. Other customized processors can include, but are not limited to, application specific integrated circuits (ASICs) and system-on-chip (SoC) applications A FPGA can be designed with the appropriate cores to include a DSP engine, a decoder, a fast Fourier transform or FFT processing element, an inverse FFT processing element, and a scaling element that can scale frequency and amplitude.

Figure 2:
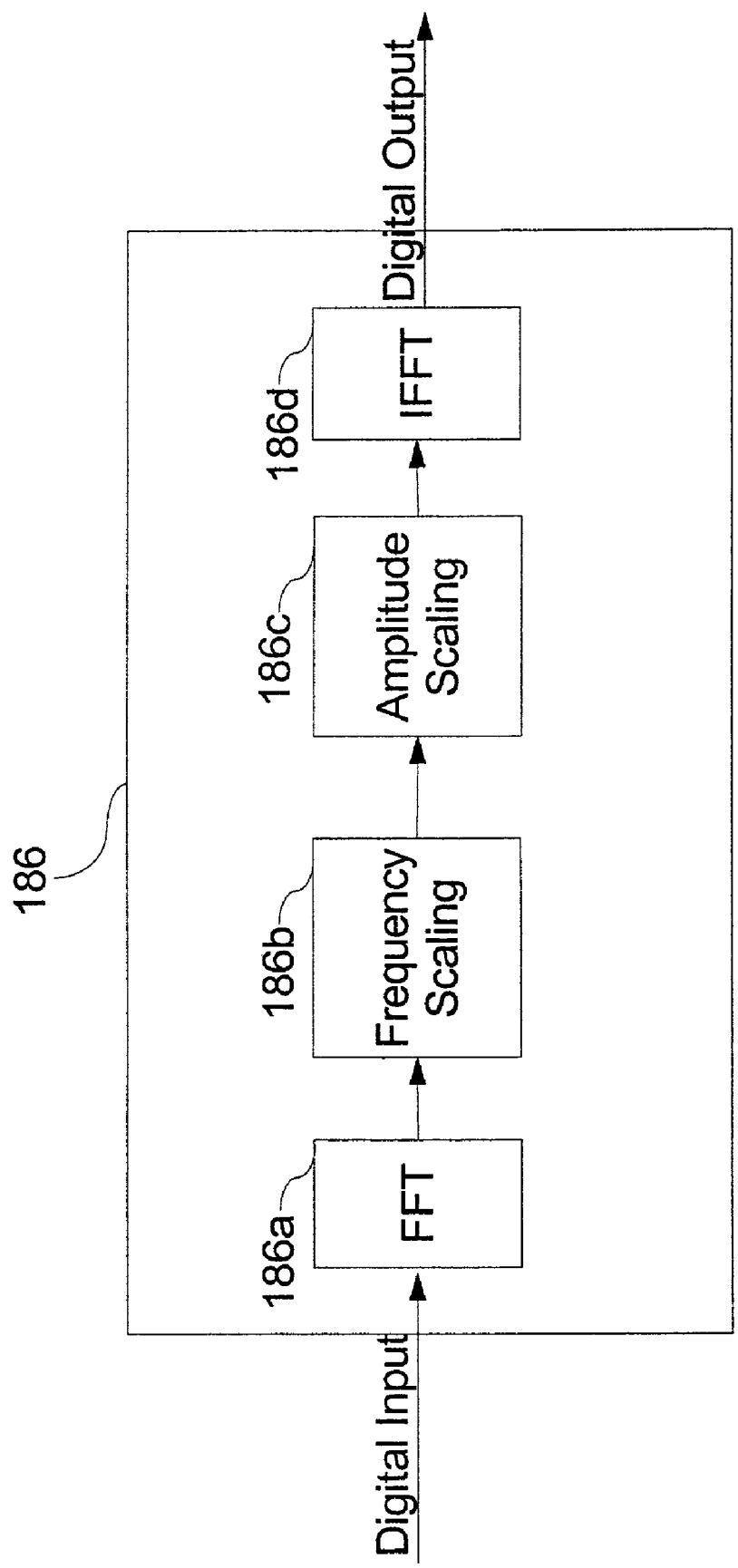
FIG. 2 is a block diagram useful for understanding frequency and amplitude scaling by utilizing a DSP in accordance with the invention.

FIG. 2 is an exemplary block diagram 200 that is useful for understanding the scaling operation of DSP 186. As shown in FIG. 2, DSP 186 can include a FFT processing element 186a, a frequency scaling element 186b, an amplitude scaling element 186c and an inverse FFT processing element 186d. FFT processing element 186a can transform digital audio samples from time domain to their frequency domain equivalents. Frequency scaling processing element 186b can be configured to receive the frequency domain audio samples and scale the frequency of the received frequency domain audio samples. Amplitude scaling element 186c can be configured to receive the frequency scaled audio samples and scale the amplitude of the received frequency scaled audio samples. Inverse FFT processing element 186d can be configured to receive and transform the amplitude scaled audio samples from the frequency domain back to their equivalent time domain audio signals. It should be recognized that although the frequency and amplitude scaling elements are separately shown, the invention is not limited in this regard. For example, a single scaling element can be configured to scale the amplitude and the frequency of audio samples.

Figure 3:
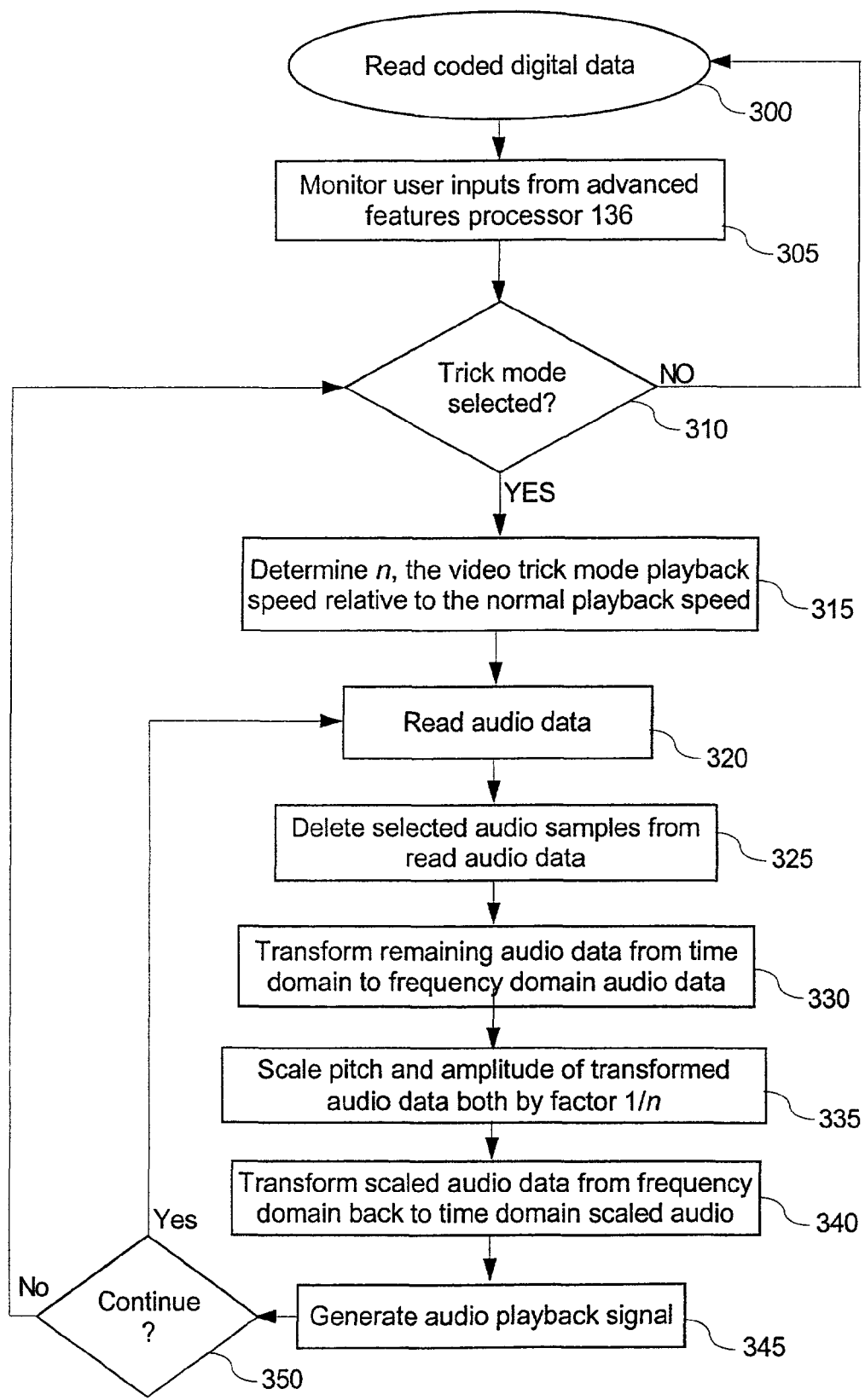
FIG. 3 is a flowchart useful for understanding the inventive arrangements of FIG. 2 as implemented in an exemplary unit such as device 100 of FIG. 1.

FIG. 3 is a flowchart that is useful for understanding the inventive arrangements of FIG. 2 as implemented in an exemplary media player such as device 100. The process in FIG. 3 is described relative to a fast forward playback since audio playback in reverse trick modes is generally not desirable. It should be understood however, that the invention is not limited in this regard. The inventive arrangements as described herein could be applied to reverse playback trick modes using similar techniques as described in FIG. 3.

The process can begin at step 300 when the unit is operated in a playback mode. In step 305, control CPU 122 can monitor user inputs from the advanced features buffer 136. In step 310, the control CPU 122 can determine whether the trick mode fast forward playback speed is selected. In a case where it has been determined that the trick mode fast forward playback has been selected, the control CPU 122 can continue to steps 315 through 345 for trick mode playback. Otherwise, control returns to processing step 300.

If a fast playback trick mode has been selected in step 310, the control CPU 122 can reconfigure packet video decoder 178 to perform trick mode video playback at speed n× where n is equal to the selected trick mode playback speed relative to a normal playback speed 1×. If the playback speed is two times faster than normal playback speed, then n=2. There are a variety of ways in which packet video decoder 178 can be configured to provide video playback at faster than normal speeds. For example, the simplest approach would be to cause the packet video decoder to simply drop certain decoded pictures. For example, every other picture to be displayed can be dropped in the case of 2× playback. However, it will be appreciated that other approaches can also be used to alter the video playback speed and the invention is not limited to any particular method of implementing a faster than normal video playback.

In step 315, the control CPU 122 can determine n, where n is the video trick mode playback speed relative to the normal playback speed. In step 320, the audio data for the segment of the video presentation that is being played back in the video trick mode can be read.

In step 325, the control CPU 122 can configure the audio decoder 182 or DSP 186 to drop selected audio samples by dropping audio samples at a rate of (n−1) of every n samples. Dropping audio samples in this manner has the advantageous effect of speeding up the audio to substantially match the speed of the video. However, if the remaining audio samples were simply passed to the audio D/A 184 for subsequent conversion to analog format, then the result would be a change in frequency of the audio by a factor of n. This change in frequency can cause voices to be high pitched and difficult to understand. Accordingly, the digital audio output from the audio decoder 182 can be processed by DSP 186.

In step 330, the DSP can transform remaining audio samples from time domain to their corresponding frequency domain equivalents. Control CPU 122 can advantageously select the DSP 186 as the input for audio D/A 184. The DSP 186 can receive digitized audio from the audio decoder 182 and processes such audio to create more natural sounding audio. More particularly, in step 330 the DSP 186 can configure the FFT processing element 186a to transform received audio signals that are in the time domain, to frequency domain audio signals.

In step 335, DSP 186 can configure frequency scaling element 186b to scale the frequency of the frequency domain audio signal by a factor 1/n. DSP 186 can also configure amplitude scaling element 186c to scale the amplitude of the frequency domain signals by 1/n. Advantageously, scaling the amplitude of the audio signal can reduce the energy content of the audio signal making the signal more manageable for processing.

In step 340, the scaled audio signals that are in the frequency domain can be transformed back to the time domain using an inverse fast Fourier transform or IFFT processing element 186d. Notably, by utilizing the frequency and amplitude scaling function of the DSP 186, the pitch or frequency of the digitized audio can be scaled up or down in order to compensate for the selective elimination of audio samples in step 325 associated with the change in the playback speed.

In step 345, the frequency and amplitude scaled time domain audio signal can be used to generate the playback signal, and the trick mode playback is performed with the player 100 configured as described. In step 350, a determination is made whether to continue scaling the audio signal. Control CPU 122 can periodically check advanced feature processor 136 to determine whether fast forward playback mode has been terminated or is still selected. In the case where the fast forward playback mode has been selected, then the control CPU 122 can return to step 320 and continues trick mode playback. In the case where the current fast forward playback mode has been deselected, that is, the user has commanded that the trick mode playback be discontinued, then control can return to step 310.

The inventive arrangements as described herein can be applied to slow playback trick modes using the same techniques as described in FIG. 3. In this case n will be a value less than 1×. For example, n=½ for 50% slower playback. Further, in step 325, rather than dropping samples, selected time domain audio samples can be repeated at a rate inversely proportional to the slow playback speed n to generate an audio playback signal. The audio samples can be repeated at an average rate of about 1/n. In step 335, the frequency scaling element 186b can be configured to scale the frequency of the audio samples by a factor of 1/n. However, for the slow speed playback case, the amplitude scaling element 186c can be configured to scale the amplitude of the audio samples by a factor n, rather than 1/n factor used for fast playback modes.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD player system similar to that shown in FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

What is claimed is:

1. A method for playing an audio track during video trick mode playback of a video presentation, the method comprising:
    reading digital data from a storage medium, said digital data representing audio programming corresponding to the video presentation;
    decoding a plurality of digital audio samples corresponding to a selected portion of the video presentation from a portion of said read digital data;
    repeating or dropping selected ones of said digital audio samples at a rate corresponding to a selected trick mode video playback speed of said video presentation;
    transforming said digital audio samples from time domain to corresponding frequency domain audio samples; and
    scaling a playback audio frequency of said frequency domain audio samples in accordance with said trick mode playback.

2. The method according to claim 1, further comprising:
    generating an audio playback signal corresponding only to a remaining set of said audio samples.

3. The method according to claim 2, wherein said time domain audio samples are dropped at an average rate of every (n−1) of every n samples, where n is equal to the selected trick mode playback speed relative to a normal playback speed.

4. The method according to claim 3, wherein said scaling step further comprises scaling said playback audio frequency by a factor of approximately 1/n.

5. The method according to claim 4, wherein said scaling step further comprises scaling an amplitude of said frequency domain audio samples by factor of approximately 1/n.

6. The method according to claim 1, wherein said scaling step further comprises transforming said scaled frequency domain audio samples to corresponding time domain digital audio samples.

7. The method according to claim 1, further comprising:
    repeating selected ones of said time domain audio samples at a rate inversely proportional to a selected trick mode video playback speed of said video presentation to produce a trick mode set of audio samples; and,
    generating an audio playback signal corresponding to said trick mode set of said audio samples.

8. The method according to claim 7, wherein said time domain audio samples are repeated at an average rate of about 1/n times, where n is equal to the selected trick mode playback speed relative to a normal playback speed.

9. The method according to claim 8, wherein said scaling step further comprises scaling said playback audio frequency by a multiplying factor of approximately 1/n.

10. The method according to claim 9, wherein said scaling step further comprises scaling an amplitude of said frequency domain audio samples by factor of approximately n.

11. The method according to claim 1 wherein said storage medium is selected from the group consisting of a DVD, a magneto optical disk, a magnetic hard disk, a video CD, and a solid state memory device.

12. The method according to claim 1 wherein said coded digital data has an MPEG format and said reading step further comprises decoding an MPEG bit stream to obtain said audio samples.

13. An apparatus for playing an audio track during video trick mode playback of a video presentation, the apparatus comprising:
    a storage medium reader for reading digital data from a storage medium, said digital data comprising audio programming corresponding to the video presentation;
    a decoder for decoding from a portion of said read digital data representative of said audio programming, a plurality of digital audio samples corresponding to a selected portion of the video presentation;
    a control processor for repeating or dropping selected ones of said digital audio samples at a rate corresponding to a selected trick mode video playback speed of said video presentation;
    a digital signal processor (DSP) comprising a fast Fourier transform (FFT) processing element for transforming said digital audio samples from time domain to corresponding frequency domain audio samples; and,
    said digital signal processor comprising a scaling element for scaling a playback audio frequency of said frequency domain audio samples in accordance with said trick mode playback.

14. The apparatus according to claim 13, wherein at least one of said decoder and said DSP comprises said control processor for repeating or dropping selected ones of said time domain audio samples at a rate approximately corresponding to a selected trick mode video playback speed of said video presentation.

15. The apparatus according to claim 14, wherein said time domain audio samples are dropped at an average rate of (n−1) of every n samples, where n is equal to the selected trick mode playback speed relative to a normal playback speed.

16. The apparatus according to claim 15, wherein said scaling element scales said playback audio frequency by a factor of approximately 1/n.

17. The apparatus according to claim 16, wherein said scaling element further comprises an amplitude adjusting element for scaling an amplitude of said frequency domain audio samples by factor of approximately 1/n.

18. The apparatus according to claim 13, wherein said DSP further comprises an inverse FFT (IFFT) processing element for transforming said scaled frequency domain audio samples to corresponding time domain digital audio samples for said audio playback signal.

19. The apparatus according to claim 13, wherein said control processor repeats selected ones of said time domain audio samples at a rate inversely proportional to a selected trick mode video playback speed of said video presentation to produce a trick mode set of audio samples.

20. The apparatus according to claim 19, wherein said audio samples are repeated at an average rate of about 1/n times, where n is equal to the selected trick mode playback speed relative to a normal playback speed.

21. The apparatus according to claim 20, wherein said scaling element scales said playback audio frequency by a multiplying factor of approximately 1/n.

22. The apparatus according to claim 21, wherein said DSP further comprises an amplitude scaling element for scaling said frequency domain audio samples by a factor of approximately n.

23. The apparatus according to claim 13, wherein said storage medium is selected from the group consisting of a DVD, a magneto-optical disk, a magnetic hard disk, a video CD, and a solid state memory device.

24. The apparatus according to claim 13, wherein said coded digital data is an MPEG format and said reading step further comprises decoding an MPEG bit stream to obtain said audio samples.

\* \* \* \* \*